US006614380B1

(12) United States Patent
Desai et al.

(10) Patent No.: US 6,614,380 B1
(45) Date of Patent: Sep. 2, 2003

(54) REVERSE DOME SWITCH

(75) Inventors: Tejas Desai, Sterling Heights, MI (US); Susan Johnson, Rochester, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 383 days.

(21) Appl. No.: 09/584,996

(22) Filed: Jun. 1, 2000

Related U.S. Application Data

(60) Provisional application No. 60/151,630, filed on Aug. 31, 1999.

(51) Int. Cl.[7] .......................... G08C 19/12; H04L 17/02

(52) U.S. Cl. ........................ 341/176; 200/512; 361/749

(58) Field of Search ................................ 341/176, 173; 340/825.31; 200/512, 511; 361/748, 749

(56) References Cited

U.S. PATENT DOCUMENTS

| | | | | | |
|---|---|---|---|---|---|
| 3,898,421 | A | * | 8/1975 | Suzumura | 200/159 B |
| 4,720,610 | A | * | 1/1988 | MacHarrie | 200/159 B |
| 5,819,568 | A | * | 10/1998 | Christie et al. | 70/395 |
| 6,031,465 | A | * | 2/2000 | Burgess | 340/825.31 |
| 6,208,271 | B1 | * | 3/2001 | Armstrong | 341/34 |

* cited by examiner

*Primary Examiner*—Timothy Edwards

(57) ABSTRACT

A key fob for signaling a receiver includes a housing having at least one depressable dome for initiating transmission of a signal. A circuit board disposed within the housing is printed onto the circuit board for generating the signal. The circuit board includes a switch situated beneath the dome. A bulge molded into the circuit board carries the switch. The bulge is depressable for closing the switch and transmitting the signal.

13 Claims, 2 Drawing Sheets

REVERSE DOME SWITCH

This application claims priority to provisional patent application No. 60/151,630, which was filed Aug. 31, 1999. The subject invention relates generally to an improved circuit board for a key fob.

BACKGROUND OF THE INVENTION

A key fob is a remote control assembly for signaling a receiver located on a vehicle. The key fob includes a housing having at least one flexible dome that is depressable for transmitting a signal. Typically, three or four domes protrude through the housing, each for signaling a different electrical component on the vehicle, such as, for example a door lock, a trunk latch, a panic alert, and the like. Each of the domes is depressable independent of the other domes for initiating transmission of the signal.

A circuit board is disposed within the housing. An electrical circuit is printed on the circuit board for generating the signals. The electrical circuit includes a switch situated beneath each of the domes. Typically, each switch is closed by depressing the adjacent dome. The dome includes conductive material that contacts the switch allowing current to flow through the circuit to a transmitter.

Circuit boards now being used in key fobs are formed from a rigid composite material having a thickness of up to two millimeters. Consumer trends have indicated fob is by reducing the thickness of the circuit board the electrical circuit is printed on. However, to do so, provisions must be made for the switch to meet the operational standards required of the prior art. Thus, a need exists for a thinner circuit board that still provides each of the features available in switches used in today's circuit boards.

SUMMARY OF THE INVENTION AND ADVANTAGES

The present invention discloses a flexible switch disposed upon a flexible circuit board. A key fob assembly for signaling a receiver on a vehicle includes a housing having at least one depressable dome for initiating transmission of a signal. A circuit board is disposed within the housing. An electrical circuit is printed on the circuit board. The electrical circuit includes a switch situated beneath the dome. The circuit board is formed from a flexible composite material having a thickness of less than one millimeter. A bulge is molded into the circuit board having the switch is printed beneath. The bulge is depressable for closing the switch and transmitting the signal. The assembly includes conductive material adjacent the switch for closing the switch when the bulge is depressed by the dome.

Combining the flexible circuit with the depressable bulge for closing the switch provides the ability to reduce the overall thickness of the key fob. First, the flexible circuit board is thinner than the conventional rigid circuit boards therefore requiring less volume displaced within the housing. Further, the flexible circuit board does not require a fixed linear space in the housing as a rigid circuit board does. The flexible circuit board can be manipulated to fit irregular contours in a smaller housing. Still further, the depressable bulge meets operational features available in the prior art switches commonly used in the thicker circuit boards of current key fobs.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
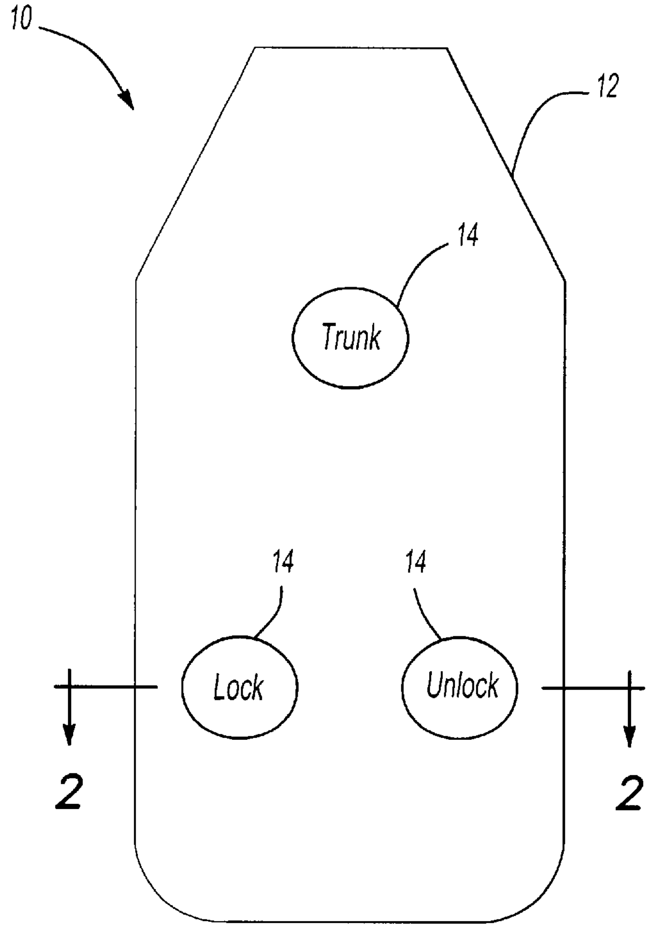
FIG. 1 is a top view of the remote control assembly of the subject invention.

Referring to FIG. 1, a key fob assembly for signaling a receiver is generally shown at 10. The assembly 10 includes a housing 12 having at least one dome 14 protruding therethrough. The dome 14 is depressable for initiating transmission of a signal. In the preferred embodiment, a plurality of domes 14 protrudes through the housing 12. Each dome 14 transmits a different signal for actuating electrical devices on a vehicle (not shown). The devices include, for example, a door lock, a trunk unlatch, a panic alarm, and the like.

Figure 2:
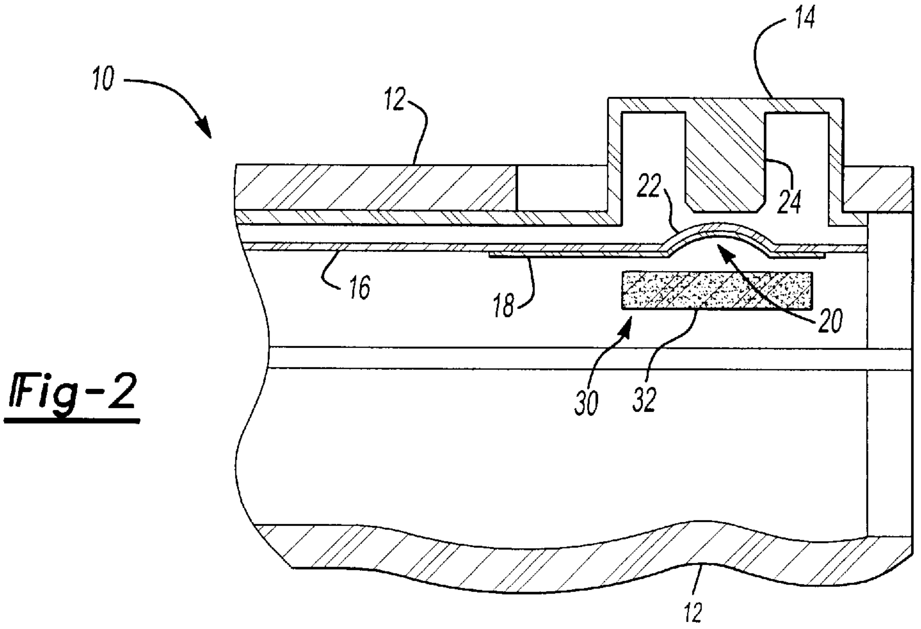
FIG. 2 is a partial sectional view of the subject invention through line 2—2 of FIG. 1.
Figure 4:
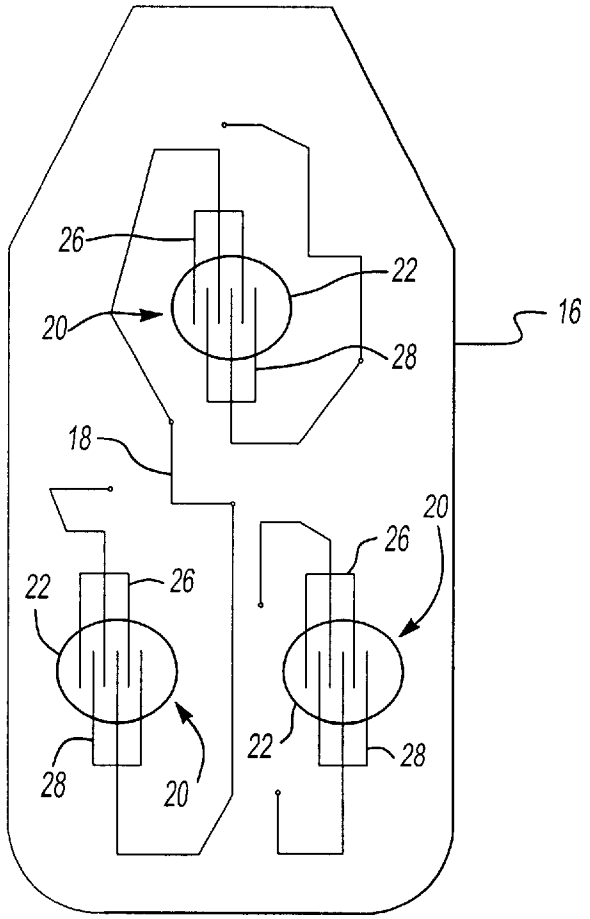
FIG. 4 is a top view of the circuit board of the subject invention.

As shown in FIG. 2, a circuit board 16 is disposed within the housing 12. An electrical circuit 18 is printed onto the circuit board 16 (FIG. 4). The electrical circuit 18 includes at least one switch 20 situated beneath the dome 14. For a plurality of domes 14, each dome 14 has a switch 20 situated therebeneath. When one of the switches 20 is closed, the electrical circuit 18 transmits a signal to a transmitter in the key fob, which transmits a signal to a receiver on the vehicle for actuating one of the electrical devices. Each switch 20 transmits a different signal for actuating different electrical devices.

A bulge 22 is molded into the circuit board 16 above each switch 20. Each bulge 22 is depressable for closing the switch 20 and transmitting the signal. Each of the bulges 22 is biased towards the dome 14 it is situated beneath. As seen in FIG. 2, a plunger 24 is disposed beneath each dome 14 whereby depressing the dome 14 drives the plunger 24 into contact with the bulge 22. Subsequently, the plunger 24 depresses the bulge 22 for closing the switch 20.

Referring to FIG. 4, each of the switches 20 includes a first group of first fingers 26 and a second group of second fingers 28. Each of the first fingers 26 is spaced apart from each of the second fingers 28 in an interleafing pattern. The switch 20 is representative of those commonly used in current vehicle remote controls. To close the switch 20, a connection must be made between one of the first fingers 26 and one of the second fingers 28. A signal is transmitted when one of the switches 20 is closed.

Figure 3:
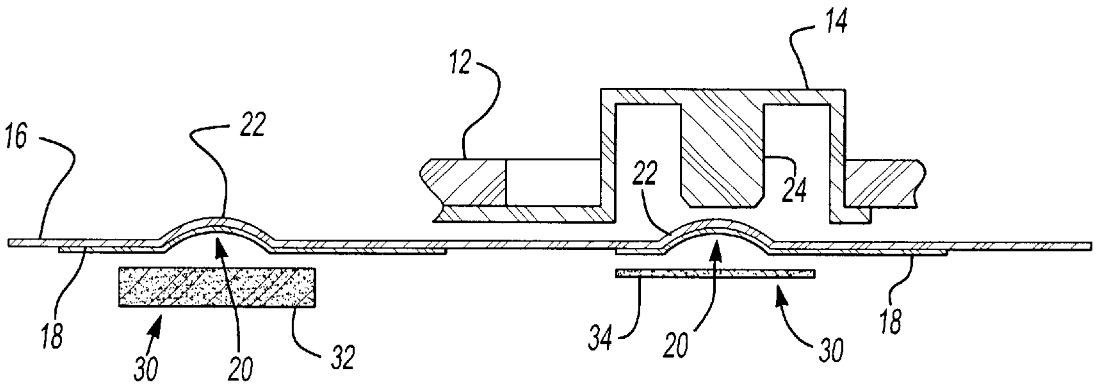
FIG. 3 is a section view of the circuit board of the subject invention through line 2—2 of FIG. 1.

As best shown in FIGS. 2 and 3, conductive material 30 is located beneath and adjacent the fingers 26, 28 for connecting the first fingers 26 to the second fingers 28 when the bulge 22 is depressed. The conductive material 30 closes the switch 20 by connecting the first fingers 26 to the second fingers 28 allowing current to flow through the circuit 18 for transmitting the signal. The appropriate electrical circuits and connections are within the skill of a worker in this art. The bulge 22 is biased towards the dome 14, therefore, the bulge 22 returns to original position when the dome 14 is released opening the switch 20 and terminating the current flow. That is the switch 20 has a relaxed position where it is spaced from the conductive material 30.

Any of the hardware disposed within the housing 12 can function as the conductive material 30 for closing the switch 20. In the preferred embodiment, the conductive material 30 comprises a battery 32. For an additional embodiment, the conductive material 30 comprises a support clip 34 for supporting the circuit board 16 or the battery 32. The inventors conceive that one item disposed within the housing 12 may function as the conductive material for closing plural switches 20. For example, two switches 20 may contact the battery 32 upon being depressed, and a third switch may contact the clip 34 upon being depressed.

The circuit board 16 comprises a flexible material. Printing the electrical circuit 18 upon the flexible material facilitates actuating the bulge 22. Further, the flexible material is thinner than conventional rigid circuit board material allowing for a decrease in volume of the housing 12. Further, manufacturing the circuit board 16 to have bulges 22 is within the skill of a worker in this art. The flexible material can also be manipulated to fit the contours of the housing 12 further enabling volume reduction within the housing.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A remote control assembly for signaling a receiver comprises:

a housing;

at least one dome protruding from said housing and being depressable for initiating transmission of a signal;

a circuit board disposed within said housing having an electrical circuit printed thereon, said circuit including a switch situated beneath said dome; and said circuit board including a bulge having said switch printed thereunder, said bulge being depressable for closing the switch and transmitting the signal.

2. An assembly as set forth in claim 1 wherein said circuit board comprises flexible material.

3. An assembly as set forth in claim 2 wherein said bulge is biased towards said dome.

4. An assembly as set forth in claim 1 wherein said switch includes a first group of fingers and a second group of fingers, each of said first fingers being spaced apart from each of said second fingers in an interleafing pattern.

5. An assembly as set forth in claim 4 including conductive material located adjacent said fingers for connecting said first fingers to said second fingers when said bulge is depressed.

6. An assembly as set forth in claim 1 including conductive material spaced from said circuit board and said bulge in a direction away from said dome, with said bulge contacting said conductive material when said bulge is depressed to close said switch.

7. An assembly as set forth in claim 6 wherein said conductive material comprises a battery.

8. An assembly as set forth in claim 6 wherein said conductive material comprises a support clip.

9. A remote control assembly for signaling a receiver comprises:

a housing;

at least one dome protruding from said housing and being depressable for initiating transmission of a signal;

a circuit board comprising flexible material disposed within said housing having an electrical circuit printed thereon, said circuit including a switch situated beneath said dome; and said circuit board including a bulge biased towards said dome and having said switch printed thereunder, said bulge being depressable for contacting conductive material and closing the switch for transmitting the signal.

10. An assembly as set forth in claim 9 including conductive material for contacting said circuit and closing said switch.

11. An assembly as set forth in claim 9 wherein said conductive material comprises a battery.

12. An assembly as set forth in claim 9 wherein said conductive material comprises a support clip.

13. A method for transmitting a signal from a remote control assembly by closing a switch on a circuit board disposed within the assembly comprises:

providing a switch including a circuit board having a bulge biased towards a dome switch, said bulge having a switch printed there under, said bulge being depressable for contacting conductive material and closing the switch;

depressing the dome for contacting the switch;

displacing the switch by flexing the circuit board bulge with the dome; and closing the switch by contacting the conductive material situated adjacent the displaced switch.

* * * * *